(12) United States Patent
Siounis et al.

(10) Patent No.: US 8,606,642 B2
(45) Date of Patent: Dec. 10, 2013

(54) REMOTE AND/OR VIRTUAL MALL SHOPPING EXPERIENCE

(76) Inventors: Constantine Siounis, Greenlawn, NY (US); Christine Siounis, Greenlawn, NY (US)

(*) Notice: Subject to any disclaimer, the term of this patent is extended or adjusted under 35 U.S.C. 154(b) by 178 days.

(21) Appl. No.: 12/931,474

(22) Filed: Feb. 1, 2011

(65) Prior Publication Data
US 2011/0208619 A1    Aug. 25, 2011

Related U.S. Application Data

(60) Provisional application No. 61/307,656, filed on Feb. 24, 2010.

(51) Int. Cl.
*G06Q 30/00* (2012.01)

(52) U.S. Cl.
USPC ..... 705/26.1; 705/26.61; 705/27.1; 705/27.2; 705/500

(58) Field of Classification Search
USPC ............... 705/26.1, 27.1, 27.2, 500, 26.61
See application file for complete search history.

(56) References Cited

U.S. PATENT DOCUMENTS

| | | |
|---|---|---|
| 2003/0055745 A1* | 3/2003 | Kim .............................. 705/26 |
| 2010/0030578 A1* | 2/2010 | Siddique et al. ................. 705/3 |
| 2011/0213678 A1* | 9/2011 | Chorney .................... 705/26.61 |
| 2012/0022976 A1* | 1/2012 | Almeida ..................... 705/27.1 |

FOREIGN PATENT DOCUMENTS

| | | | | |
|---|---|---|---|---|
| KR | 2002003119 A | * | 1/2002 | |
| KR | 2005090245 A | * | 9/2005 | |

* cited by examiner

*Primary Examiner* — Yogesh C Garg

(57) ABSTRACT

A computer-implemented method of enabling remote and/or a virtual shopping of an actual retail store is disclosed. Software provides a means of creating custom, electronic shopping mall configurations that may include a plurality of participating retail stores, each of which may be selected from a list of participating retailers. The mall's stores and walkways may be selectable to launch a remote/virtual shopping experience. Navigation is by moving a cursor to browse for desired merchandise. Remote shopping is achieved through the use of a plurality of cameras at participating stores to provide live streaming images of store merchandise for remote shopping, or a series of recorded images that permit virtual shopping. All images may be embedded with merchandise information. Holding the cursor over a merchandise image may reveal embedded information. Views obstructed by a live shopper in the live streaming image may be supplanted by the beginning-of-day stored images.

9 Claims, 10 Drawing Sheets

FIG. 2

Select Store From List

1. Abercrombie & Fitch
2. _Aeropostale_
3. Aerosoles
4. American Eagle Outfitters
5. Ann Taylor
6. Banana Republic
7. Barnes & Noble
8. Bath & Body Works
9. Best Buy
10. Bloomingdale's
11. Bostonian
12. Burger King
13. Champs Sports ↓ More ↓

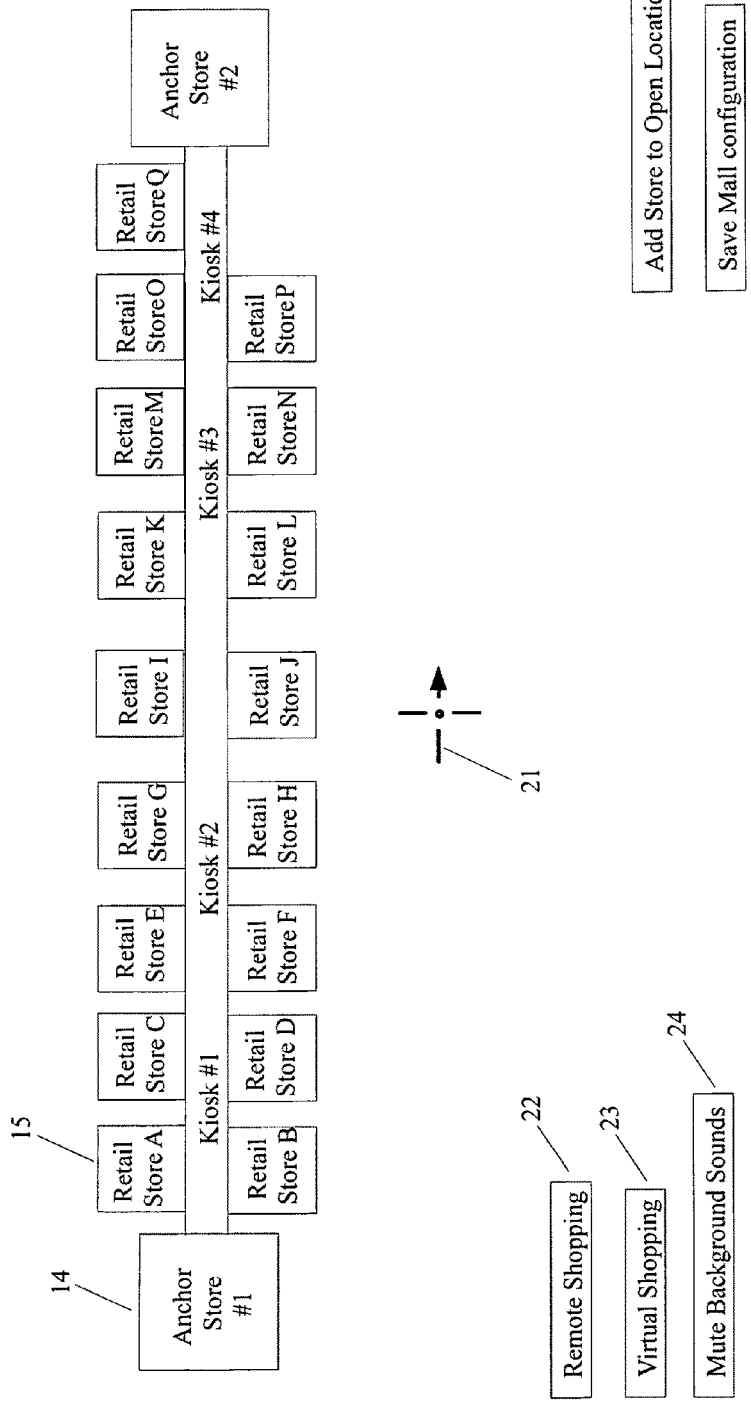

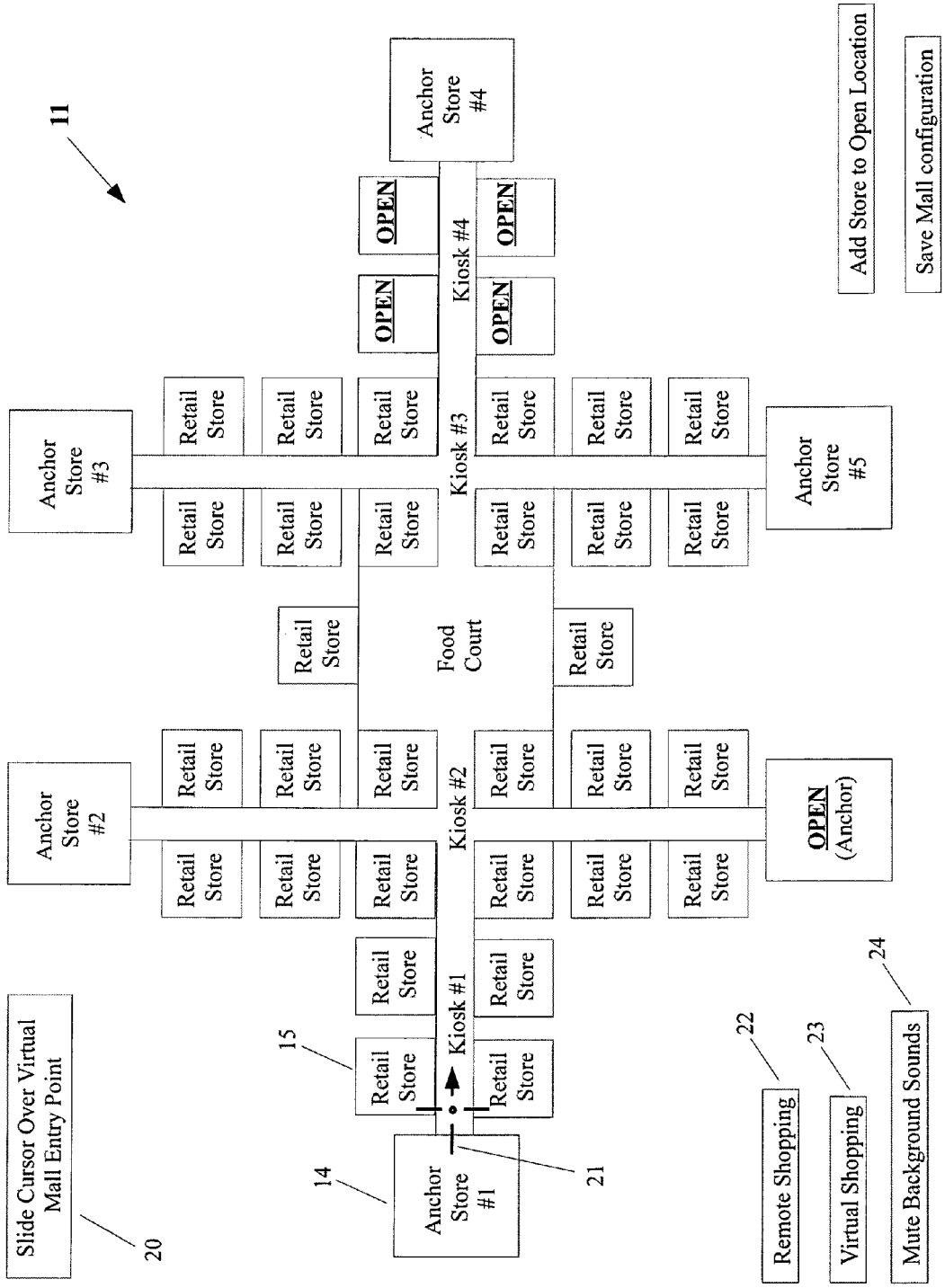

REMOTE AND/OR VIRTUAL MALL SHOPPING EXPERIENCE

CROSS REFERENCES TO RELATED APPLICATIONS

This application claims priority on U.S. Provisional Application Ser. No. 61/307,656 filed on Feb. 24, 2010, the disclosures of which are incorporated herein by reference.

FIELD OF THE INVENTION

The present invention relates to improvements in online shopping experiences, and more particularly to a method and apparatus which are capable of providing a remote but actual shopping experience, a virtual shopping experience, or a unique combination of the two.

BACKGROUND OF THE INVENTION

The development of the internet as a means of obtaining information has also seen the appearance of its use as a means of purchasing products, with the most notable being perhaps the launching of Amazon.com in 1995 and of eBay in 1996. Although online shopping has grown to the point where a large percentage of businesses now host an internet web-page and market directly to consumers online, the ability of a consumer to shop is still largely dictated by his or her own awareness of a particular store and its associated web-site, or their skill in "surfing" the web.

Some inventions within the prior art have sought to improve the online shopping experience, but still fall short of providing the participant a realistic home shopping experience, compared to the method and apparatus disclosed herein. For example, U.S. Pat. No. 7,072,860 to Kakuta for "Electronic Shopping Mall" discloses a straight-forward system for "an electronic shopping mall that includes one or more virtual shops and is provided on a communication network to offer and sell products or services to a customer in response to an access provided by the customer via the communication network . . . ." However, the bulk of the Kakuta disclosure is directed to a discount calculation parameter and methods of incentivizing a customer to purchase based on a discounted price, and a means of negotiating, without serving to enhance the actual online shopping experience.

U.S. Pat. No. 7,266,511 to Teshima for "Method and System for Operating a Virtual Shopping Mall . . . " discloses greater detail as to the shopping environment. The Teshima virtual mall comprises a seller registering virtual goods by submitting virtual goods information and the provision of image data using "a picture reading unit, which obtains image data of the real goods from a picture of the real goods brought in to the terminal base by the seller." While this provides an improvement to generic online shopping at each individual store's web site, the method adds very little in the way of enhancing the shopping experience for a user being at home on his/her computer. All the Teshima method essentially achieves is the co-location of various virtual shops.

Similarly, U.S. Pat. No. 7,725,362 to Weathers for "Virtual Group Shopping Mall" discloses a system wherein the mall is "receiving a request from the user for providing sales information of the product available in the on-line shopping mall . . . " and where the sales information may include a brand name, and a picture of the product and the online store selling the product. The Weathers' invention, like most others, is directed towards the basic query, product information, pricing, and the sale. The Weathers shopping mall, just like the other inventions, does not serve to engage the shopper in the actual shopping experience. The inventions are truly "virtual." The invention herein seeks to accomplish some of those same goals in accommodating a consumer's online purchases, but does so by also providing a real and dynamic shopping experience. The online mall herein is not just "virtual," but may be the combination of a real interactive shopping experience being conducted remotely, or may be a pure virtual experience, as with the other prior art inventions, or it may be a combination of those two shopping experiences, as disclosed hereinafter.

OBJECTS OF THE INVENTION

It is an object of the invention to provide a method of enabling a person to shop at favorite retail stores remotely from his/her own home.

It is another object of the invention to provide a means of remotely shopping at retail stores that provides the same atmosphere as if the shopper were actually in the store.

It is a further object of the invention to provide a means of enabling a remote shopper to create a customized mall configuration using software of the current invention usable on a personal computer that enables remote shopping at his/her favorite retail stores.

It is another object of the invention to provide a means of enabling a shopper to participate in either remote shopping or virtual shopping by toggling a button.

It is also an object of the invention to provide a mean of creating a remote, interactive, social shopping network.

Further objects and advantages of the invention will become apparent from the following description and claims, and from the accompanying drawings.

SUMMARY OF THE INVENTION

A computer-implemented method of enabling a combination of a remote and/or a virtual shopping experience relating to an actual retail store environment is disclosed by the software of the current invention. The software herein provides a means of creating a custom, electronic shopping mall configuration that may include a plurality of participating retail stores. Each of the retail stores in the shopping mall configuration, as well as the walkways pictured therein, may be selectable to launch the remote/virtual shopping experience. Navigating remotely around a selected store may be by moving a cursor to browse for desired merchandise.

Remote shopping is accomplished herein through the use of a plurality of cameras at each of the participating retail stores, where the cameras provide visual images of merchandise available for purchase at the participating retail store. These visual images may comprise either a live streaming image of the store merchandise to enable remote shopping, or a series of images that had been recorded at the beginning of a shopping day to permit virtual shopping.

The visual images may be passed through a store server that may embed information relating to corresponding merchandise images. Holding the cursor over an image of desired merchandise may reveal the embedded merchandise information. When merchandise is on sale, the embedded information may contain a sale sign proximate to that merchandise, a sign which may always visible to the remote shopper, even when the cursor is not overlaying the merchandise. Clicking on the desired merchandise may summon an online customer service representative to assist in answering any question about the merchandise, or about store policy regarding purchases or returns. Purchases may be made by clicking to add a desired item into a shopping cart, where they may be purchased like most online transactions.

Custom mall configurations may be created using one or more of: an actual mall configuration, and one of many different pre-designed templates of mall store locations. These templates may take any geometric form necessary to suitably accommodate a particular number of retail stores. The store locations in a custom mall configuration may be populated by selecting retail stores from a list of participating retailers.

In the case where a remote shopper's view is obstructed by a live shopper who is actually browsing through the real store, and at least a part of the desired merchandise is not visible, the live streaming image may be supplemented by, or even supplanted by, the beginning-of-day stored images for the desired merchandise.

BRIEF DESCRIPTION OF THE DRAWINGS

FIG. 2 is a screen-shot of the listing of participating stores for use in creating the custom mall configuration of FIG. 1.

FIG. 3A is a screen-shot illustrating a user's first customized mall configuration.

FIG. 3B is a screen-shot illustrating a user's second customized mall configuration.

DETAILED DESCRIPTION OF THE INVENTION

Figure 1:
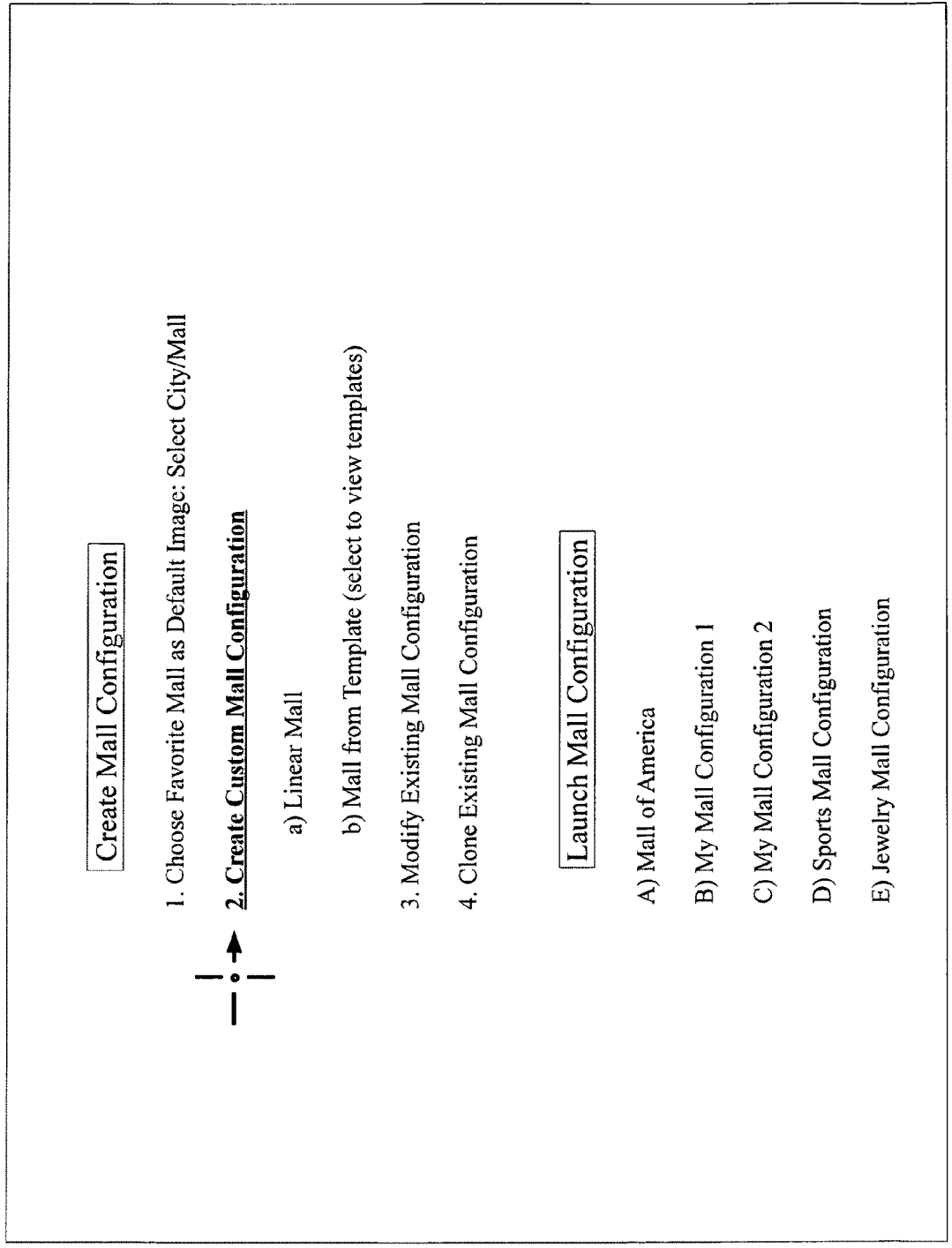
FIG. 1 is screen-shot of the start-up page of the remote/virtual shopping mall software of the present invention.

Many people throughout the world, when they are not working in their chosen occupation or at home, often tend to shop. The shopping may just be for food to feed their families, or items needed around the home, or instead, it may be a gift for themselves or a friend/relative. There are predominantly two ways to shop today. The most common way had always been to drive to a local shopping mall, which generally offers a wide range of stores, often including traditional "anchor" department stores, such as Macy's, Bloomindales, Nordstrom, Dillard's, Sears, and J.C. Penny. Many popular smaller retailers are usually also located therein, such as American Eagle Outfitters, Ann Taylor, Banana Republic, Columbia sportswear, etc. The traditional shopping mall thus provided an array of sellers the opportunity to market to a substantial amount of daily consumer-traffic, and correspondingly afforded buyers the ability to browse at their leisure through the retail merchandise of many of their favorite vendors in a single shopping experience. Beyond the traditional shopping mall stores, there are also many other stores that routinely are found at a "strip" mall, which often are mostly small independent business, but may also comprise large chains stores that are not typically located within an indoor shopping mall. For example, many chain sporting goods stores are often located at such strip malls, the most notable of which may include Bass Pro Shops, Dick's Sporting Goods, Sports Authority, Big 5 Sporting Goods, Modell's Sporting Goods, Academy Sports and Outdoor, Champs Sports, etc.

A popular alternative to traditional mall shopping has arisen through use of the internet through the maintaining of web sites by various retailers, from which the consumer, while sitting comfortably in his own home, may make the same or similar purchases as he could by being at the store itself. However, there are several major drawbacks to this kind of shopping. Very often, a buyer must purchase a gift and does not know what to choose for the recipient, and resolves the uncertainty by browsing through certain departments of a favorite or other suitable store at the mall, until finding a suitable item. Even though the problem has been addressed by recent inventions that create a virtual mall to provide analogous types of online browsing, "virtual" shopping is currently an artificial and inflexible experience that fails to satisfy many potential customers.

A first embodiment of the current invention goes beyond the virtual mall concept of the prior art, and permits a user to create a customized mall of favorite stores in which he/she may actually shop remotely, through use of cameras providing streaming images, or virtually, through the use of pre-recorded images. Alternatively, the user may shop remotely or virtually using the configuration/layout of an actual mall with which he or she may be familiar, such as, for example, the Mall of America in Bloomington, Minn. The ability to achieve this shopping experience may occur as follows.

FIG. 1 shows a screen-shot of a start-up page leading to the many possible embodiments of the present invention, which may include an option to create a mall configuration or to launch a desired mall configuration. The options to create a custom mall configuration may include, as just described, the ability to select, for the electronic mall configuration, the layout of an actual mall. Many people routinely shop at a nearby shopping mall, and may find it has all of the stores that they prefer to shop at. So a sub-menu under option one in FIG. 1 may simply list all of the known shopping malls in the United States, or even malls in foreign countries, from which the user may select a mall that will provide the layout of the user's electronic mall appearing on his or her computer monitor.

The second option for creating a mall configuration permits the user to create a custom mall. There are many possible ways to accomplish such arrangements, however, only a couple examples will be given to be illustrative. For example, a linear mall 10 may be preferred by a user, where a linear mall may be as shown in FIG. 3A in which the retail stores 15 are arranged into two rows on opposite sides of a walkway. The stores 15 may be selectable/moveable in the mall configuration so that they can be arranged according to a shopper's preference, but they may initially be displayed in alphabetical order as they are added to the linear mall configuration. The linear mall 10 seen in FIG. 3A may be built by selecting retail stores 15 from a list of participating stores, as seen in FIG. 2. The selection and placement of a store from the list onto the mall configuration may create an icon thereon which contains a link to an address at the store server. As the user selects additional stores, the mall may automatically extend, so if a shopper were to select two more stores, the next store—"Store R," would appear to the right of "Store P" and below "Store Q," while "Store S" would appear on the top row to the right of "Store Q." As seen in FIG. 2, when the shopper desires to add more stores, he/she may toggle the "Add More Stores" button in the bottom right, and when they are satisfied with the mall configuration, they may toggle the "Save Mall Configuration" button.

Instead of the simple linear mall 10 configuration, the user may select, from FIG. 1, the "Mall From Template" option, which may present the user with a number of different templates for creating a custom mall, each of which may offer different numbers of store locations. For example, the template 11 selected and shown in FIG. 3B supports six anchor stores and 34 additional retail store locations. An "anchor" store is a larger store that tends to attract significant numbers of customers to a mall, and often is one of the aforementioned department stores. Again, the user may select stores to populate the template from the list of participating stores shown in the screen shot of FIG. 2. Initially, the template would show all the store locations as being "OPEN." Since the template shown in FIG. 3B has been populated with five anchor stores (Anchor Stores 1-5) and thirty retail stores, there are still four remaining open locations for other retail stores and one remaining location for an anchor store.

Options are also provided in the screen shot of FIG. 1 for modifying an existing mall configuration, possibly to change it to a larger template or to just add stores, or to clone an existing mall configuration to create a similar mall configuration.

Also seen in FIG. 1 is a means of launching any of the stored mall configurations. It should be noted from viewing that list, that a user may advantageously organize his or her shopping according to different malls that are tailored to a particular kind of product being sought or a common product type, in addition to having a mall configuration with a variety of different types of stores therein. For example, a sports enthusiast may have a mall configuration ("Sports Mall Configuration") that includes each of the previously cited sporting goods stores. Some stores that may sell common types of merchandise may consisting principally of selling the following: arts and crafts; books; cards and gifts; children's fashions; cigars and tobacco; cookware; department stores; electronics; health and beauty; home furnishing; jewelry; luggage; men's fashions; women's fashions; and shoes.

To be illustrative, if "My Mall configuration 2" were launched, it would appear as seen in FIG. 3B. The shopper may then slide the cursor 21 to a place in the mall in which he/she desires to begin shopping. Remote shopping may be accomplished in each of the stores within the mall to have a more enjoyable realistic shopping experience by having each participating store install cameras within one of their many store locations. The cameras may then transmit live streaming images of the entire store environment, and may be specially adapted for transmitting images of the merchandise available for purchase therein. The cameras may transmit the images to a store server, which may serve several functions, in addition to streaming the live images. The store server may record the image transmitted at the start of the shopping day, to be used in relation to virtual shopping, as discussed hereinafter. The store server may also be used to embed product information with respect to a corresponding piece of merchandise viewable in a transmitted image. The product information may include any and all such information that the shopper might have available to them when actually at the store, such as from signage, etc.

Figure 4:
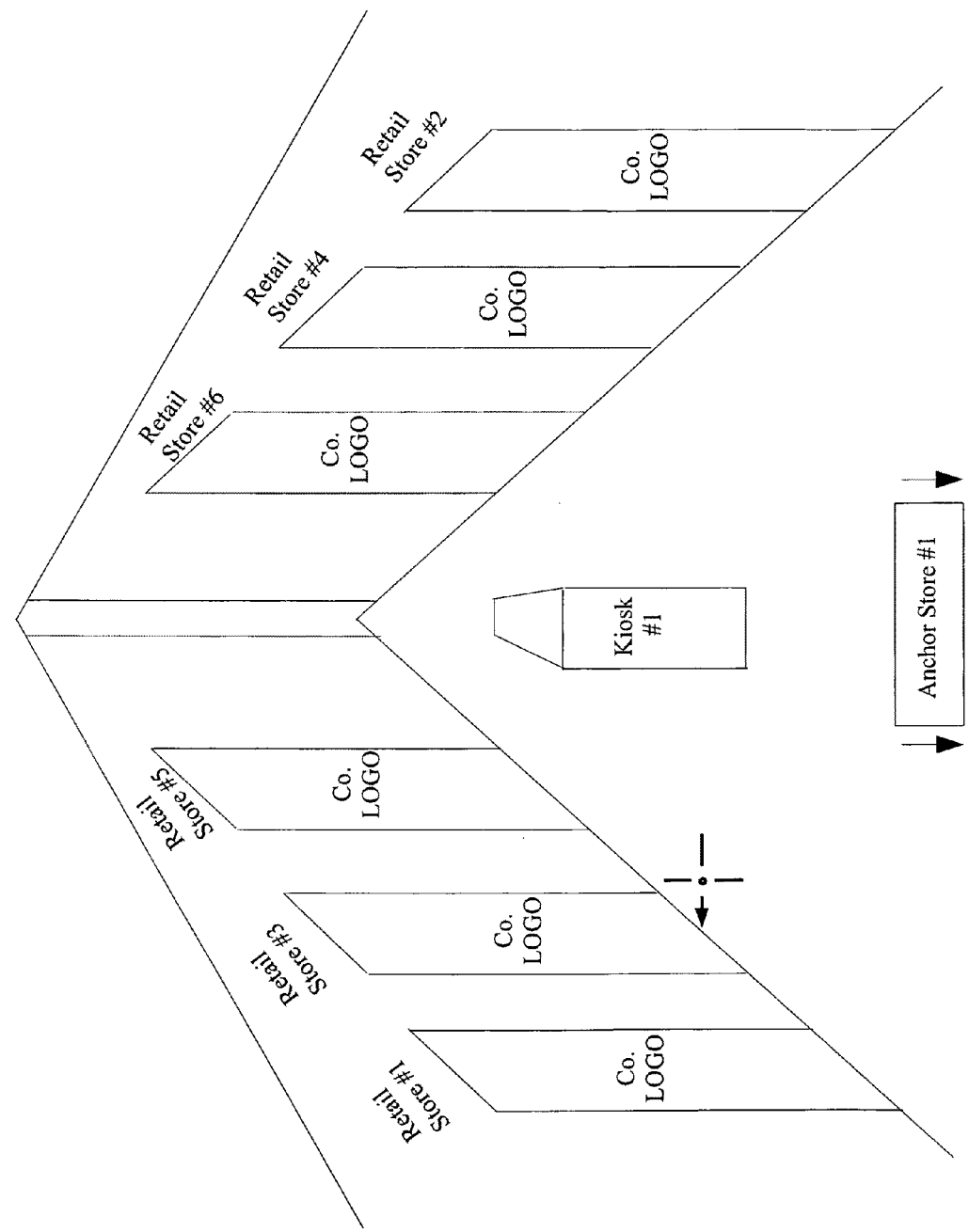
FIG. 4 is a screen shot illustrating remote shopping in the remote/virtual shopping mall of FIG. 1.

The remote shopping experience is best discussed in terms of an example. As seen in FIG. 3B, if the user selected the shown cursor location 21 to begin the shopping experience, the start of the shopping experience may begin as seen in FIG. 4, where the images are of a theoretical walkway of the mall. Conversely, had the shopper used the cursor to select a store, the initial image would have been of that position within the selected store. Many malls have kiosks selling merchandise within those walkways, and these kiosk merchants may also be available within the list of retail stores, and be selectable to be located within the fictional walkways. Where an actual mall configuration was selected, such as for the Mall of America, the kiosks actually located therein would appear in the image of FIG. 4, as well as all of the shoppers on that particular day, at that time of day. In addition, the cameras located therein may also transmit sounds that would be heard at that position in the mall. For some shoppers, that may not be desirable, so the software may preferable comprise a Mute Background Sounds button 24, to filter off the mall sound from the transmitted images.

Because some shoppers prefer to browse with other shoppers being present in addition to the salespeople, feeling that it completes the shopping atmosphere, while others feel distressed at too many people being present while walking the mall, the present invention may include buttons to permit the cyber shopper to either shop purely remotely—and thus may include a "Remote Shopping" button 22, in which his/her computer will receive live streaming images, or to shop virtually, and thus may include a "Virtual Shopping" button 23, which may utilize the beginning-of-day streaming images that were recorded onto the store server.

Figure 5A:
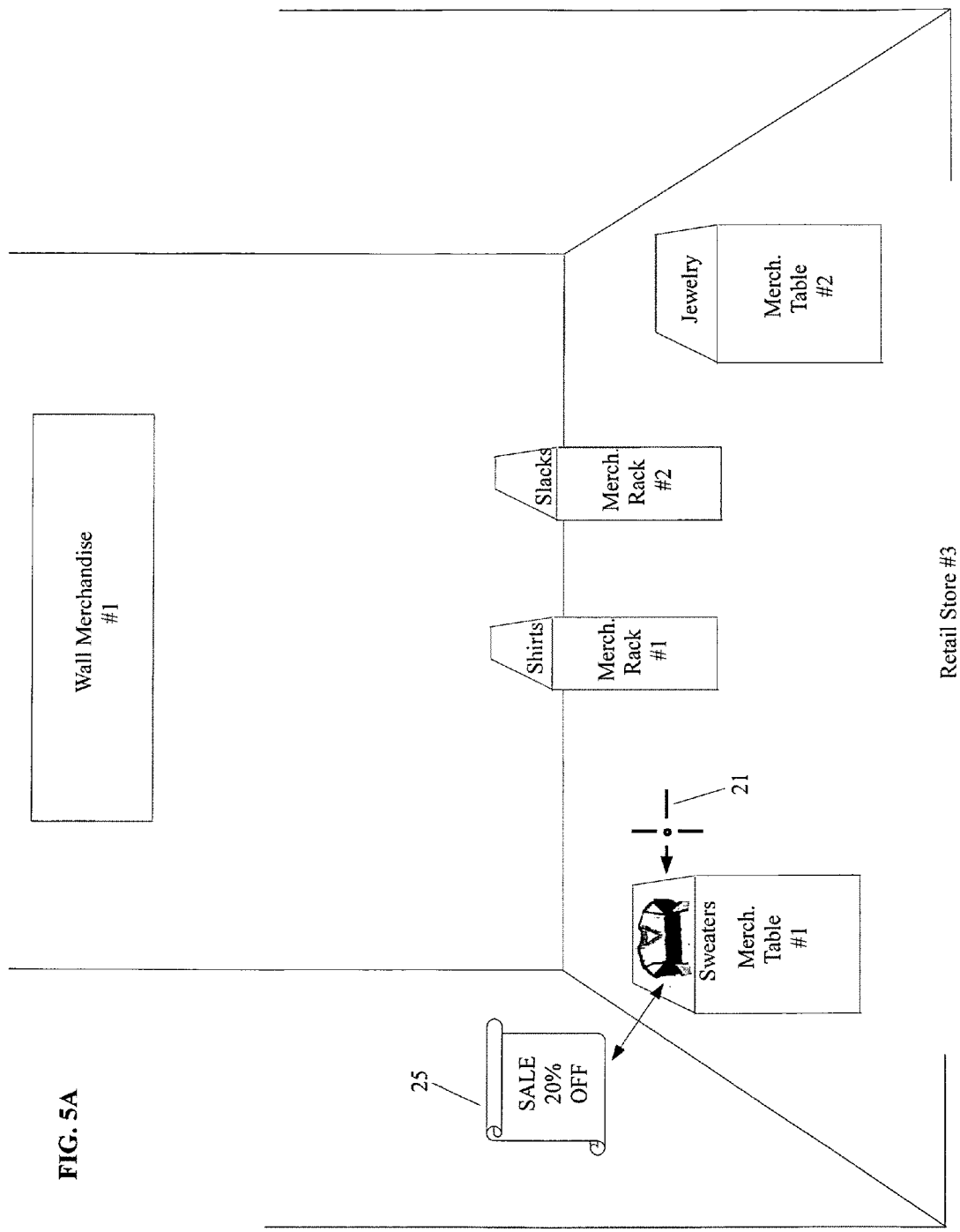
FIG. 5A is a screen shot of a retail store participating in the remote shopping experience of the present invention.

Once the shopper is in a place within the mall, he or she may progress along the walkway and/or from store to store using the indoor walkways, by movement of the cursor. As seen in FIG. 4, the entrances to each store may be identified with a Company Logo. If the shopper decides to browse for a gift in Retail Store #3, he/she may move the cursor towards the store logo, which causes the display to change to the image immediately inside of the store, as seen in FIG. 5A. The movement may preferably be a seamless transition between images offered by the various cameras within the walkways and the cameras in the store entrance. Once inside Store #3, the shopper may browse for desired merchandise that may be observable on each of the shelves, tables, racks, walls, etc, just as if he/she were actually in the store. Where merchandise therein is on sale, the information embedded on the store server may include such sale data, and may cause the displayed image to present a special sale sign 25 to further attract the shopper's attention and encourage impulse buying. In addition, similar sale signs or advertised special may be displayed at the entrance of the store to further encourage buyers to enter that store to bolster sales from potential impulse buyers.

Figure 5B:
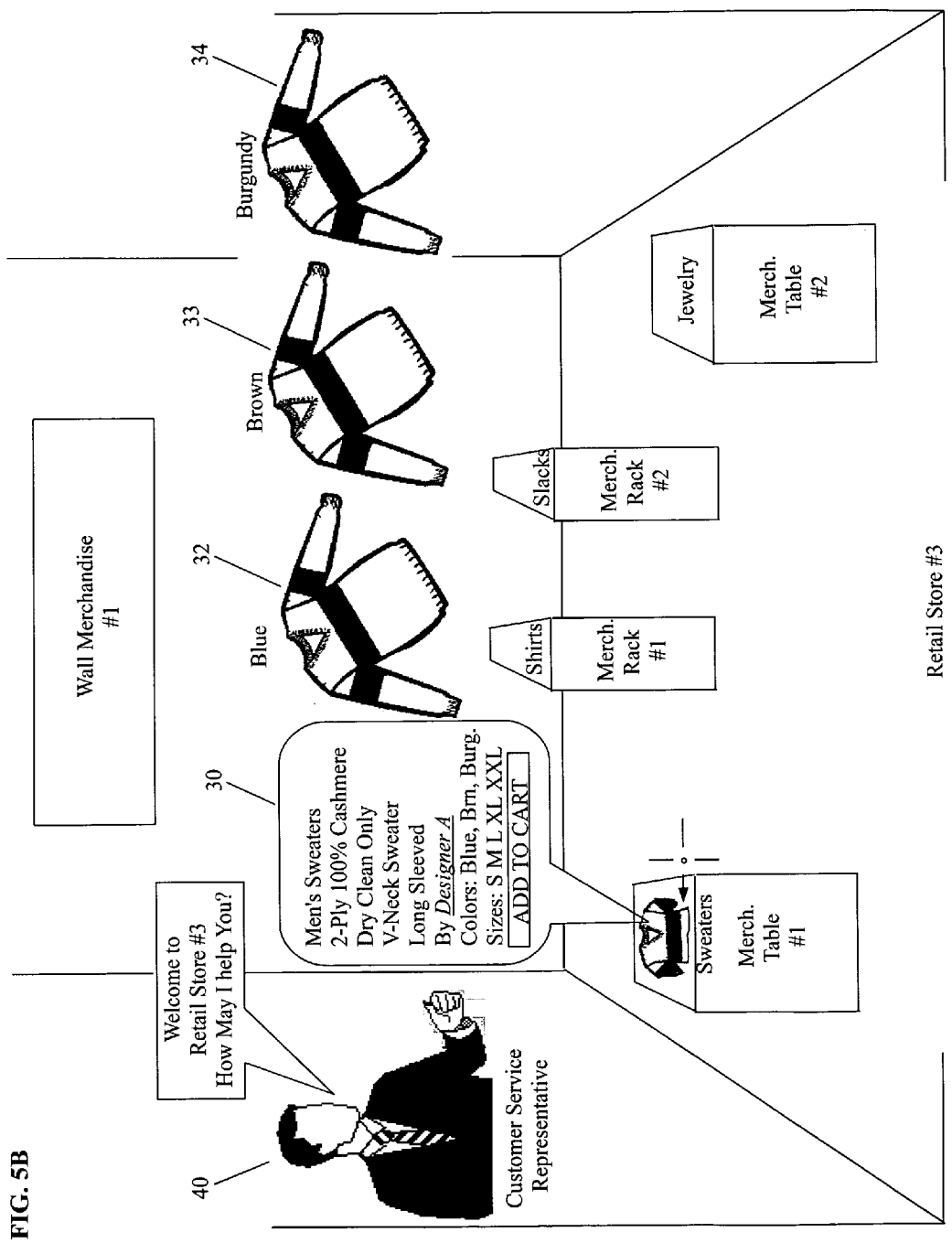
FIG. 5B is a screen shot of the retail store of FIG. 5A, but with the displaying of embedded information for the merchandise which the remote shopper selected using the movable cursor, and showing a pop-up salesperson.

When a buyer locates desired merchandise, such as the sweaters that are on sale in Retail Store #3, he/she may slide the cursor over the merchandise, which may cause the image to appear as in the screen shot of FIG. 5B, in which a display pops up to reveals the embedded merchandise information 30. Merchandise information 30 may include such information as the manufacturer's name, materials used, recommended cleaning methods, colors available, sizes available, etc. In addition to the embedded information, the pop-up display may also feature images of the unfolded product (possibly both the front and back) in each of the available colors/patterns, since they may not be readily viewable to the remote shopper when folded neatly on a table. Therefore, in FIG. 5B, the pop-up display also shows a blue version 32 of the sweater, as well as the brown version 33, and burgundy version 34. If the shopper actually clicks on the merchandise rather than merely sliding the cursor over it, this may signal the desire for assistance and a salesperson icon 40 may thereafter appear onscreen to answer questions. The salesperson icon 40 may represent an actual salesperson at Store #3 that may be dedicated to answering question posed by online remote/virtual shoppers. The questioning and answering may comprise text messages, or may comprise an audio connection therebetween.

Figure 5C:
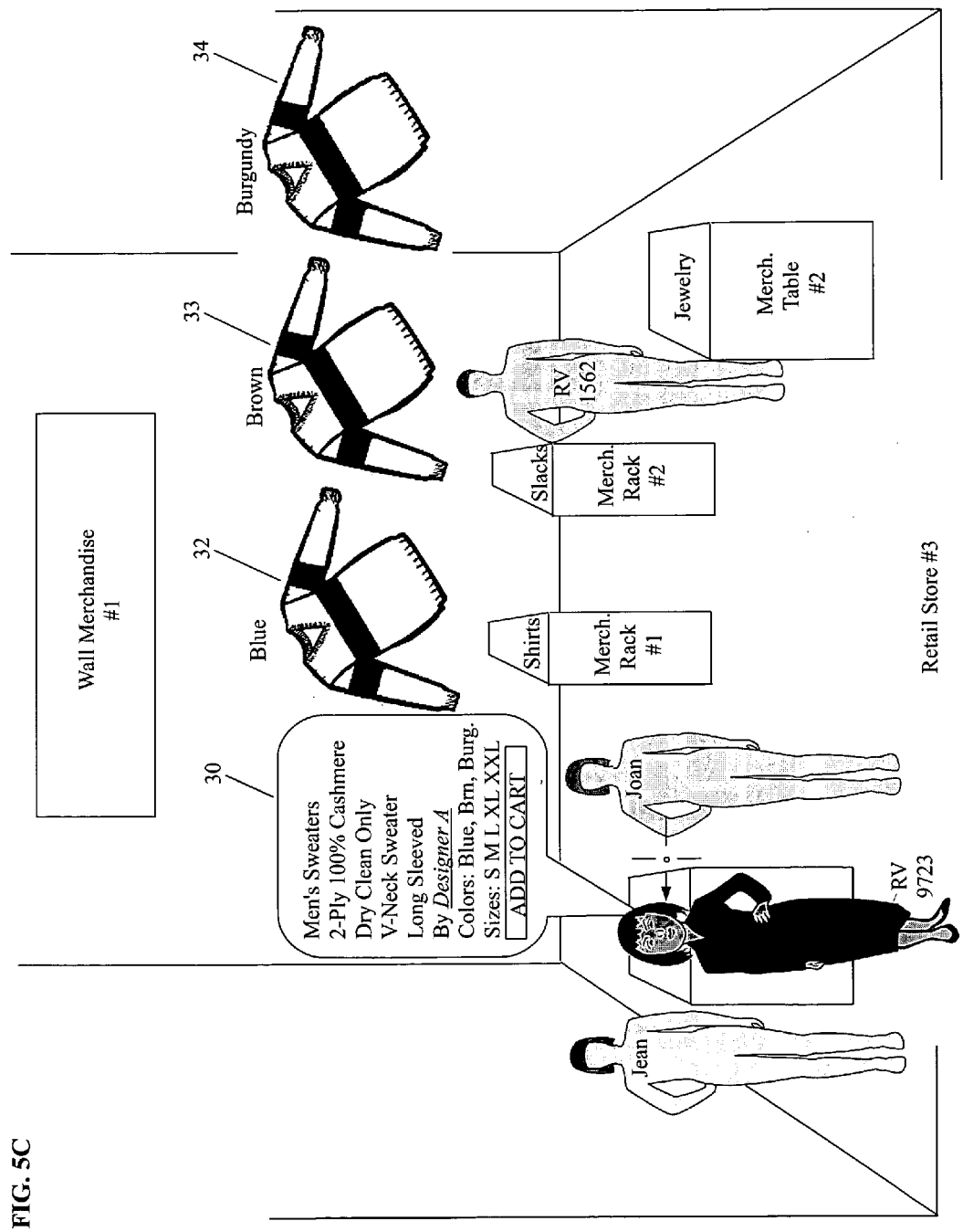
FIG. 5C is a screen shot of the retail store of FIG. 5A, but with the displaying of embedded information for the merchandise which the remote shopper obtained by sliding the movable cursor over the merchandise, and with the displaying of virtual shopper icons and a live shopper blocking merchandise
Figure 5D:
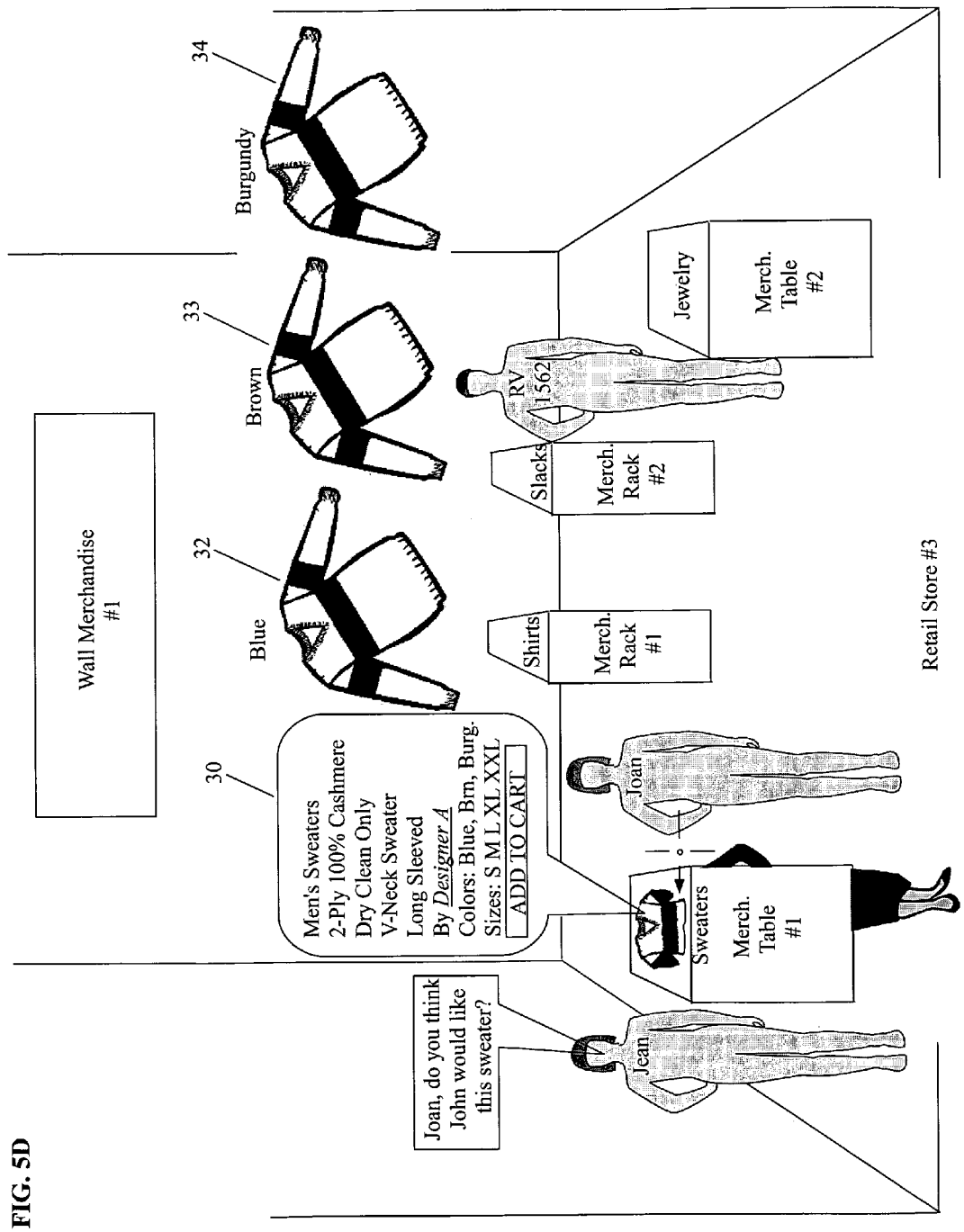
FIG. 5D is a screen shot of a retail store of FIG. 5C, but where the image of the merchandise being blocked by the live shopper has been supplemented by beginning-of-the-day recorded images of that merchandise, and where group shopping is accomplished with communication between two remote shoppers.
Figure 6:
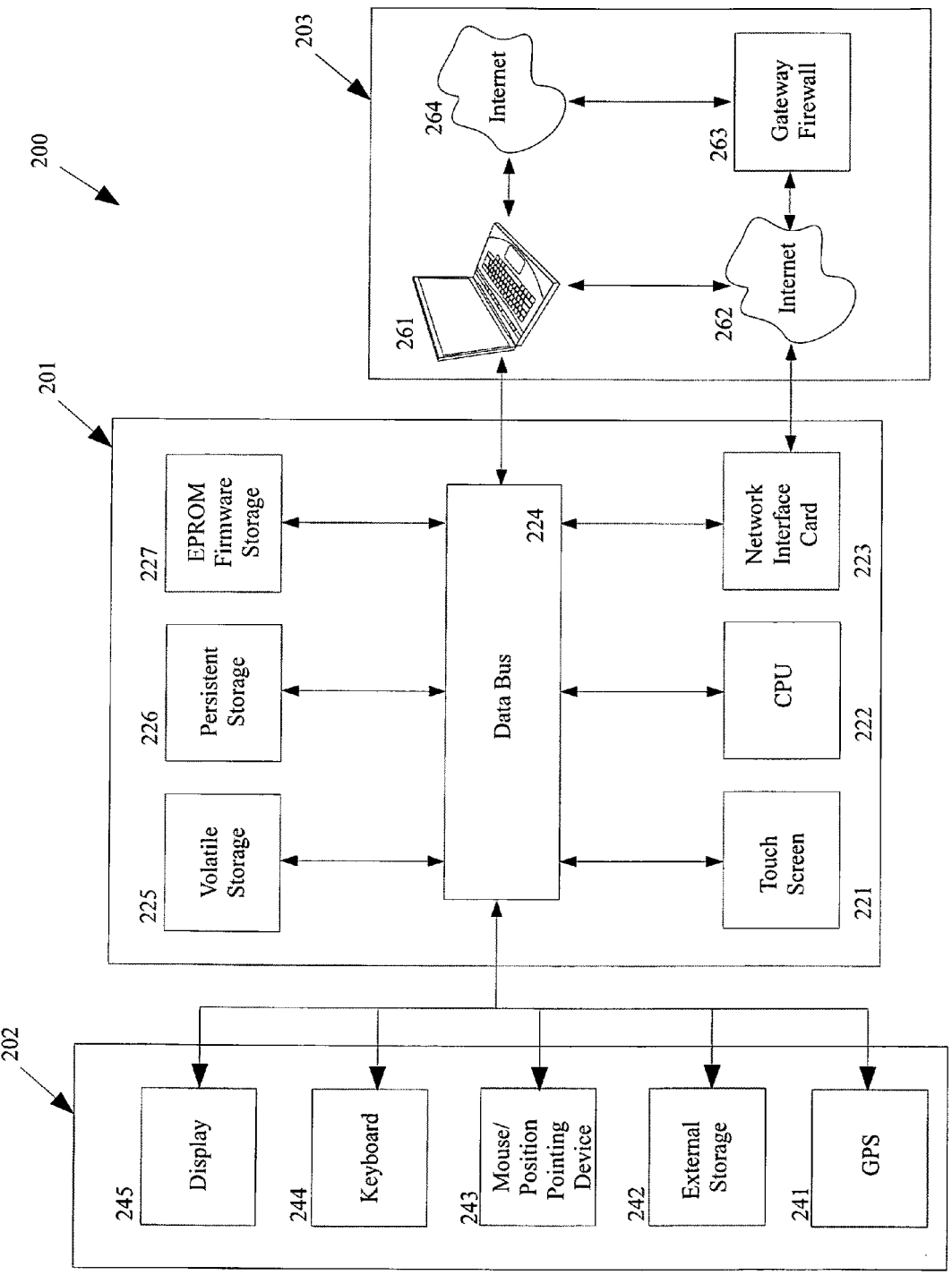
FIG. 6 is a schematic of an exemplary computing unit interacting with external peripherals, and being capable of funning the software of the current invention.

In the case of a person preferring to conduct shopping in the remote environment, with many other "live" shoppers also being present in the store, the live shoppers may occasionally obstruct a remote shopper's view, as seen in FIG. 5C. Therefore, in one embodiment of the present invention, whenever the remote shopper slides the cursor in a direction, and particularly over a display of merchandise, the live streaming image of the merchandise may be automatically supplanted by the beginning-of-day stored images for the desired merchandise, when it is blocked by a live shopper, as seen in FIG. 5D. Once a shopper has acquired sufficient interest in the desired merchandise to warrant making a purchase, a selectable icon within the embedded merchandise information may permit the shopper to add the item to a shopping cart. The purchase can then be made with a credit card, store gift certificate, and any other means of making a purchase, with the product being shipped to the remote/virtual purchaser.

Since remote/virtual shoppers may spend many consecutive hours online shopping, and may prefer to be served food as if they could simply enjoy the food court at an actual mall, rather then taking time to prepare food themselves, the software of the present invention may also permit placement of store icons in the food court area of FIG. 3B. These food court icons may represent local eateries in the remote shopper's home city that is a participating vendor, and which may be able to deliver the food to the remote/virtual shopper in a timely fashion. For example, when initially signing up as a remote shopper and listing one's physical address, the software may direct the shopper to a menu that lists participating food vendors in the same or nearby zip code, such as a local Pizza Hut. The remote shopper may be able to order off of the online menu for Pizza Hut, and then continue shopping, only having to take a short break to answer the door when the food is delivered.

In another embodiment of the current invention, the remote/virtual shopper may also be able to visually see, on his/her computer screen, the other remote/virtual shoppers, and may thus be able to move together around the store and shop as a group, by following their friend's icon. Each shopper may be able to either choose a generic icon to represent them online, such as for Jean, Joan, and the remote/virtual shopper RV1562 in FIG. 5D. Alternatively, the remote/virtual shopper may be able to upload a current photograph, which may serve as the icon, such as for the woman (RV9723) blocking the merchandise in FIG. 5C. The software may also permit communication between remote/virtual shoppers, being either textual or aural communications conducted across the internet, and thereby permits remote shopping of a group of friends who may be in their own homes on opposite sides of a city, or even on the other side of the country. Such an embodiment may also permit adult offspring to go on a remote shopping venture together with parents or other relatives living at great distances away, to buy a better-chosen gift. Thus, the software of the present invention may also create a remote, interactive, social shopping network. In FIG. 5D, Joan and Jean are remote shopping from their respective homes, but shopping at the same store, while being visually aware of each other as if they were both physically in the store, and being in communication with each other on screen—being either textual or aural communication. This embodiment will require that the shopper's computer be in communication with the store server or a mall server that hosts the walkway views, in order that the remote-virtual shopper image locations are transmitted universally, along with the merchandise images and embedded merchandise information.

To be properly enabled, the use of any software utilized by the present invention and running on a computer or being accessed therefrom, requires a description of such a computer system. An exemplary computer system 200, through which the user may participate in the virtual mall, is shown schematically in FIG. 5, and which may comprise a computing unit 201 interacting with external peripherals 202, such as a separate GPS receiver 241, and interacting with network resources 203, including a PC 261, which may be a laptop computer. A complete exemplary computer system will be described for an understanding of how the virtual mall software may interact with and on computing unit 201, even though an embodiment involving usage of the software may not require each of the described computer components.

The computing unit 201 may include a data bus 224 or other communication mechanism for communicating information across and among various parts of computing unit 201, and a central processing unit ("processor" or CPU) 222 coupled with a bus 224 for processing information and performing other computational and control tasks. Computing unit 201 may also include a volatile storage 225, such as a random access memory (RAM) or other dynamic storage device, coupled to bus 224 for storing various information as well as instructions to be executed by processor 222. The RAM may be Dynamic Random Access Memory (DRAM), or Static RAM (SRAM), or any other similar type of RAM known in the art. The volatile storage 225 also may be used for storing temporary variables or other intermediate information during execution of instructions by processor 222. Computing unit 201 may further include a read only memory (ROM) or an erasable programmable memory (EPROM) 227 or other static storage device coupled to bus 224 for storing static information and instructions for processor 222, such as basic input-output system (BIOS), as well as various system configuration parameters. A persistent storage device or non-volatile memory 226, such as a magnetic disk, optical disk, or solid-state flash memory device may be provided and may be coupled to bus 224 for storing information and instructions.

Computing unit 201 may be coupled via bus 224 to a touch screen display 221, such as a plasma display, or a liquid crystal display (LCD), for displaying information to a user of the computing unit 201. If desired, the computing unit 201 may also be coupled via bus 224 to an external display screen 245, which may further comprise a cathode ray tube (CRT). An external input device 244, including alphanumeric and other keys, may also be coupled to bus 224 for communicating information and command selections to processor 222. Another type of user input device is cursor control device 243, such as a mouse, a trackball, or cursor direction keys for communicating direction information and command selections to processor 222 and for controlling cursor movement on display 245, if desired. Also, a cursor control device 243 may also be utilized for the PC 261 of the network resources 203.

An external storage device 242 may be connected to the computing unit 201 via bus 224 to provide an extra or removable storage capacity for the computing unit 201. In an embodiment of the computer system 200, the external removable storage device 242 may be used to facilitate exchange of data with other computer systems.

According to one embodiment of the invention, the techniques described herein are performed by computing unit 201 in response to processor 222 executing one or more sequences of one or more instructions contained in the volatile memory 225. Such instructions may be read into volatile memory 225 from another computer-readable medium, such as persistent storage device or non-volatile memory device 226. Execution of the sequences of instructions contained in the volatile memory 225 causes processor 222 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 222 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 226. Volatile media includes dynamic memory, such as volatile storage 225. Transmission media includes coaxial cables, copper wire and fiber optics, including the wires that comprise data bus 224. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 222 for execution. For example, the instructions may initially be carried on a magnetic disk from a remote computer. Alternatively, a remote computer can load the instructions into its dynamic memory and send the instructions over a telephone line using a modem. A modem local to computer system 200 can receive the data on the telephone line. The bus 222 may carry the data to the volatile storage 225, from which processor 222 retrieves and executes the instructions. The instructions received by the volatile memory 225 may optionally be stored on persistent storage device 226 either before or after execution by processor 222. The instructions may also be downloaded into the computing unit 201 via Internet using a variety of network data communication protocols well known in the art.

The computing unit 201 may also include a communication interface, such as network interface card 223 coupled to the data bus 222. Communication interface 223 provides a two-way data communication coupling to a network link that may be connected to a local network 262. For example, communication interface 223 may be an integrated services digital network (ISDN) card or a modem to provide a data communication connection to a corresponding type of telephone line. As another example, communication interface 223 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 223 sends and receives electrical, electromagnetic or optical signals that carry digital data streams representing various types of information.

Network link 223 typically provides data communication to other network resources. For example, the network link may provide a connection through local network 262 to a host computer 261, or the computing unit 201 may connect directly to the host computer 261. Alternatively, the network link 223 may connect through gateway/firewall 263 to the wide-area or global network 264, such as an Internet. Thus, the computing unit 201 can access network resources located anywhere on the Internet 264. On the other hand, the computing unit 201 may also be accessed by others, with permission, that may be located anywhere on the local area network 262 and/or the Internet 264. The other users may themselves be operating a platform similar to computer system 200.

Local network 262 and the Internet both use electrical, electromagnetic or optical signals that carry digital data streams. The signals through the various networks and the signals on network link and through communication interface 262, which carry the digital data to and from computing unit 201, are exemplary forms of carrier waves transporting the information.

Computing unit 201 may be able to send messages and receive data, including program code, through the variety of network(s) including the Internet 264 and LAN 262, network link and communication interface 233. In the Internet example, when the computing unit 201 acts as a network server, it might transmit a requested code or data for an application program running on PC 261 through the Internet 264, gateway/firewall 263, local area network 262 and communication interface 223. Similarly, it may receive code from other network resources.

The received code may be executed by processor 222 as it is received, and/or stored in persistent or volatile storage devices 226 and 225, respectively, or other non-volatile storage for later execution. In this manner, computer system 200 may obtain application code in the form of a carrier wave.

The examples and descriptions provided merely illustrate a preferred embodiment of the present invention. Those skilled in the art and having the benefit of the present disclosure will appreciate that further embodiments may be implemented with various changes within the scope of the present invention. Other modifications, substitutions, omissions and changes may be made in the design, size, materials used or proportions, operating conditions, assembly sequence, or arrangement or positioning of elements and members of the preferred embodiment without departing from the spirit of this invention.

All references cited in this document are incorporated herein in their entirety by reference.

We claim:

1. A computer program product for use in creating a combination of a remote and/or a virtual shopping experience relating to an actual retail store environment, the computer program product comprising a non-transitory computer readable storage medium having computer readable program code embodied therein, the computer readable program code configured for causing a computer system to cause the display of one or more screens configured for said remote and/or virtual shopping experience and comprising:

creating a custom shopping mall configuration comprising respective icons for one or more participating retail stores, each of said one or more retail store icons in said shopping mall configuration being selectable to launch said remote/virtual shopping experience;

displaying of an image received from one or more cameras configured to provide one or more visual images of the merchandise available for purchase at each of said participating retail stores, said visual images comprising a live streaming image of the merchandise available for purchase;

displaying of information for each item of the merchandise available for purchase, said merchandise information being stored within a store server, said stored merchandise information being embedded with respect to a corresponding merchandise image; said remote and/or a virtual shopping experience including;

creating said electronic shopping mall configuration by populating a template of one or more actual existing mall store locations by selecting from a list of the actual existing participating retail stores, selecting one or more of said icons for said respective participating retail stores from said custom shopping mall configuration, said selection of said one or more retail store icons causing said displaying of an image received from said one or more cameras for said selected participating retail store;

navigating remotely around said selected store by manipulating a cursor for browsing for a desired merchandise item from among said visual images of the merchandise available for purchase; and placing of the cursor over said visual image of said desired merchandise item to reveal said embedded merchandise information.

2. The computer program product according to claim 1, said computer readable program code further configured for recording said visual images at a beginning of each day for said participating retail stores and storing said beginning-of-day images on said store server, and said computer readable program code further configured for said remotely navigating for said browsing for said desired merchandise item from either said live streaming images or said beginning-of-day stored images.

3. The computer program product according to claim 2, said computer readable program code further configured for supplanting said live streaming images with said beginning-of-day stored images wherein when a portion of said live streaming images of said desired merchandise item are obstructed.

4. The computer program product according to claim 3, said computer readable program code further configured for remotely offering assistance, by a customer service representative, when the cursor is held over said embedded information for said desired merchandise item.

5. The computer program product according to claim 4, said computer readable program code further configured for storing a sale sign in said embedded information and displaying said sale sign with said merchandise in said images, when said merchandise available for purchase is on sale.

6. The computer program product according to claim 5, said computer readable program coded further configured for selecting of said desired merchandise item and purchasing said desired merchandise item.

7. The computer program product according to claim 6, said computer readable program code further configured for creating said custom mall configuration using an actual mall configuration.

8. The computer program product according to claim 7, said computer readable program code further configured for viewing of images from one or more cameras in one or more indoor walkways of said actual mall to permit remote browsing of said walkways.

9. The computer program product according to claim 8, said computer readable program code further configured to selecting respective icons for one or more kiosks of said actual indoor mall configuration.

* * * * *